United States Patent [19]
Lunk et al.

[11] Patent Number: 5,059,483
[45] Date of Patent: Oct. 22, 1991

[54] AN ELECTRICAL CONDUCTOR INSULATED WITH MEIT-PROCESSED, CROSS-LINKED FLUOROCARBON POLYMERS

[75] Inventors: Hans E. Lunk, Menlo Park; Neal Enault, Sunnyvale; Ashok Mehan, Union City, all of Calif.

[73] Assignee: Raychem Corporation, Menlo Park, Calif.

[21] Appl. No.: 338,914

[22] Filed: Apr. 17, 1989

Related U.S. Application Data

[63] Continuation of Ser. No. 786,806, Oct. 11, 1985, abandoned.

[51] Int. Cl.[5] ........................ B32B 15/00; B32B 27/00; H01B 7/00

[52] U.S. Cl. ................................ 428/383; 174/110 F; 174/120 SR; 428/375; 428/379; 428/421; 428/422

[58] Field of Search ............... 428/375, 379, 383, 421, 428/422; 174/110 F, 120 SR; 264/173, 210.1, 210.5, DIG. 54; 156/51, 165, 229, 244.11, 244.13

[56] References Cited

U.S. PATENT DOCUMENTS

| | | | |
|---|---|---|---|
| 3,269,862 | 8/1966 | Lanza et al. | 428/383 |
| 3,408,453 | 10/1968 | Shelton, Jr. | 174/120 SR |
| 3,422,215 | 1/1969 | Humes | 427/118 |
| 3,763,222 | 10/1973 | Aronoff et al. | 360/80 |
| 3,832,481 | 8/1974 | Boyd et al. | 174/110 FCX |
| 3,840,619 | 10/1974 | Aronoff et al. | 575/276 |
| 3,852,518 | 12/1974 | Wargotz et al. | 174/120 SR |
| 3,894,118 | 7/1975 | Aronoff et al. | 428/379 |
| 3,911,192 | 10/1975 | Aronoff et al. | 428/379 |
| 3,970,770 | 7/1976 | Dhami | 428/379 |
| 3,985,716 | 10/1976 | Dhami | 260/79.3 |
| 3,995,091 | 11/1976 | Dhami | 428/379 |
| 4,031,167 | 6/1977 | Aronoff et al. | 428/379 X |
| 4,155,823 | 5/1979 | Gotcher et al. | 522/81 |
| 4,184,001 | 1/1980 | Hildreth | 428/383 |
| 4,273,829 | 6/1981 | Perreault | 174/120 SR X |
| 4,310,597 | 1/1982 | Checkland et al. | 428/383 |
| 4,353,961 | 10/1982 | Gotcher | 428/380 |
| 4,401,845 | 8/1983 | Odhner et al. | 174/110 FC X |
| 4,430,385 | 2/1984 | Dillow et al. | 428/401 X |
| 4,451,306 | 5/1984 | Verne | 174/120 SR X |

FOREIGN PATENT DOCUMENTS

| | | |
|---|---|---|
| 893080 | 2/1972 | Canada . |
| 1151255 | 8/1983 | Canada . |

OTHER PUBLICATIONS

Military Specification Sheet MIL-W-22759/34B, Published Jul. 10, 1980.

Report Number TR-2333, "Testing of Selected Aircraft Electrical Wire Insulations".

*Primary Examiner*—Lorraine T. Kendell
*Attorney, Agent, or Firm*—Edith A. Rice; Herbert G. Burkard

[57] ABSTRACT

Shaped articles of cross-linked polymers comprising a first component having little or no cross-linking and high elongation, and a second component having a relatively high level of cross-linking and low elongation. Such articles are particularly useful in the form of electrical insulation, the first component being adjacent to a wire or other conductor. Preferably each of the components comprises a crystalline fluorocarbon polymer, especially an ethylene/tetrafluoroethylene copolymer. Such articles can be prepared by (1) melt-extruding a first polymeric composition which contains little or no cross-linking agent, and a second polymeric composition which contains a greater amount of cross-linking agent, (2) maintaining the two extrudates under conditions such that cross-linking agent migrates from the second to the first composition, and (3) cross-linking both compositions, preferably by radiation.

12 Claims, 1 Drawing Sheet

AN ELECTRICAL CONDUCTOR INSULATED WITH MEIT-PROCESSED, CROSS-LINKED FLUOROCARBON POLYMERS

This application is a continuation of copending application Ser. No. 786,806, filed Oct. 11, 1985, now abandoned.

BACKGROUND OF THE INVENTION

1. Field of the Invention

This invention relates to cross-linked polymers, in particular in the form of insulation on a wire or other conductor.

2Introduction to the Invention

It is known to prepare shaped articles of cross-linked polymers by shaping a composition containing a cross-linking agent, and then subjecting the shaped article to conditions which effect cross-linking. The cross-linking agent can be a so-called chemical cross-linking agent which, when heated, decomposes into active species which effect cross-linking. Alternatively the cross-linking agent can be a radiation cross-linking agent (sometimes called a "pro-rad") which promotes cross-linking when the polymer is irradiated, preferably by electrons, e.g. from an electron beam. One particularly valuable use of cross-linked polymeric compositions is as electrical insulation on a wire or other conductor. Known insulated wires include wires coated with a layer of a radiation crosslinked fluorocarbon polymer, particularly an ethylene/tetrafluoroethylene copolymer (often referred to as an ETFE polymer), which are extensively used for the wiring in aircraft. Military Specification No. MIL-W-22759 sets various standards for such insulated wires. Reference may be made for example to U.S. Pat. Nos. 3,763,222, 3,840,619, 3,894,118, 3,911,192, 3,970,770, 3,985,716, 3,995,091, 4,031,167, 4,155,823 and 4,353,961, the disclosures of which are incorporated herein by reference.

SUMMARY OF THE INVENTION

Wires insulated with a layer of radiation-crosslinked ETFE polymer have the significant disadvantage that if the outer surface of the insulation is damaged, subsequent flexing of the wire causes the damage to propagate through the insulation, at a rate which is highly undesirable, especially when the insulated wire is to be used in an aircraft or in other high performance situations where the consequences of insulation failure can be so serious. A quantitative measure of this disadvantage can be obtained from a notch propagation test such as that described below, in which a notch is made part way through the insulation and the wire is then flexed until the conductor is exposed.

We have discovered that this disadvantage can be substantially mitigated by making use of an inner layer of an ETFE polymer which has little or no cross-linking and an outer layer of an ETFE polymer which has a relatively high level of cross-linking. Furthermore, this improvement is obtained with little or no substantial deterioration of other important properties of the insulation, for example, resistance to scrape abrasion, resistance to crossed wire abrasion and resistance to cut-through. We believe that this improvement is attributable to the greater elongation of the inner layer, and that similar improvements will be obtained with other cross-linked high-melting polymers, the polymers in the inner and outer layers being the same or different.

In one aspect, the present invention provides an insulated electrical conductor which comprises (1) an electrical conductor; and (2) electrical insulation which comprises (a) an inner electrically insulating layer which (i) is composed of a first melt-processed, cross-linked polymer composition wherein the polymer has a melting point of at least 200° C., and (ii) has a first $M_{100}$ value of 0 to 350 psi; and (b) an outer electrically insulating layer which (i) is separated from the conductor by the inner layer, (ii) is composed of a second melt-processed cross-linked polymeric composition wherein the polymer has a melting point of at least 200° C., and (iii) has a second $M_{100}$ value which is at least 350 psi and at least 50 psi higher than the first $M_{100}$ value.

The $M_{100}$ values given herein are modulus values measured at a temperature above the melting point of the polymer by the procedure described in detail below, and therefore reflect the level of cross-linking in the layer. A particularly useful embodiment of this aspect of the invention is an insulated electrical wire which comprises (1) a metal conductor; and (2) electrical insulation which surrounds the conductor and which comprises (a) a inner electrically insulating layer which (i) surrounds and is in direct physical contact with the conductor, (ii) is composed of a radiation cross-linked polymeric composition wherein the polymer consists essentially of a crystalline copolymer which has a melting point of at least 250° C. and consists essentially of 35 to 60 mole percent of units derived from ethylene, 35 to 60 mole percent of units derived from tetrafluoroethylene and 0 to 10 mole percent of units derived from at least one additional copolymerizable comonomer;

(iii) has an $M_{100}$ value at 320° C. of 0 to 350 psi;

(iv) has an elongation of at least 125%; and ( v) is 0.003 to 0.015 inch thick; and (b) an outer electrically insulating layer which (i) surrounds and is in direct physical contact with the inner layer, (ii) is composed of a radiation cross-linked polymeric composition wherein the polymer consists essentially of a crystalline copolymer which has a melting point of at least 250° C. and consists essentially of 35 to 60 mole percent of units derived from ethylene, 35 to 60 mole percent of units derived from tetrafluoroethylene and 0 to 10 mole percent of units derived from at least one additional copolymerizable comonomer;

(iii) has an $M_{100}$ value at 320° C. of at least 400 psi;

(iv) has an elongation of 50 to 120%; and (v) is 0.004 to 0.025 inch thick.

In another aspect, the invention provides a process which can be used for example to make insulated conductors as defined above and which comprises (1) melt-shaping a first polymeric composition to form a first member;

(2)melt-shaping a second polymeric composition to form a second member in contact with the first member, the second composition containing a radiation cross-linking agent;

(3) maintaining contact between the first and second members under conditions such that part of the radiation cross-linking agent migrates from the second member into the first member; and (4) irradiating the first and second components to effect cross-linking thereof.

In a particularly useful embodiment of this aspect of the invention, an insulated electrical wire is prepared by a process which comprises (1) melt-extruding over a metal conductor a first electrically insulating polymeric composition wherein the polymer consists essentially of a crystalline copolymer which has a melting point of at least 250° C. and consists essentially of 35 to 60 mole percent of ethylene, 35 to 60 mole percent of tetrafluoroethylene, and 0 to 10 mole percent of at least one additional copolymerizable comonomer, the composition containing 0 to 4% by weight of a radiation cross-linking agent, thereby forming a first insulating layer which is 0.003 to 0.015 inch thick;

(2) melt-extruding over the first insulating layer a second electrically insulating polymeric composition wherein the polymer consists essentially of a crystalline copolymer which has a melting point of at least 250° C. and consists essentially of 35 to 60 mole percent of ethylene, 35 to 60 mole percent of tetrafluoroethylene, and 0 to 10 mole percent of at least one additional copolymerizable comonomer, the composition containing 4 to 15% of a radiation cross-linking agent, thereby forming a second insulating layer which is 0.004 to 0.025 inch thick;

(3) maintaining the product of step (3) under conditions such that part of the radiation crosslinking agent in the second layer migrates into the first layer; and (4) irradiating the product of step (3);

the process conditions being such that in the product of step (4) the first layer has an $M_{100}$ value at 320° C. of 0 to 350 psi and an elongation of at least 125%, and the second layer has an $M_{100}$ value of 320° C. of at least 400 psi and an elongation of 50 to 120%.

BRIEF DESCRIPTION OF THE DRAWING

The invention is illustrated in the accompanying drawing, in which the Figure is a cross-section through an insulated wire of the invention.

DETAILED DESCRIPTION OF THE INVENTION

Figure 1:
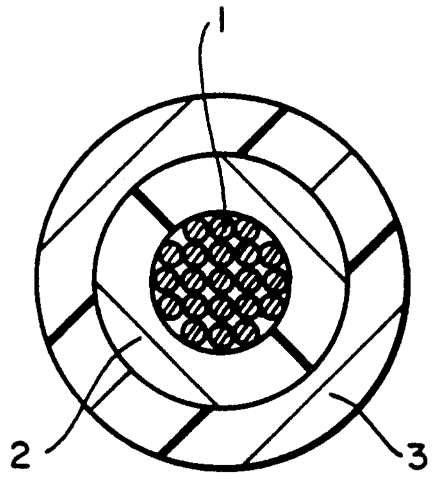

The polymeric component in the polymeric compositions used in the present invention preferably comprises, and more preferably consists essentially of, a melt-shapeable crystalline polymer having a melting point of at least 200° C., preferably at least 250° C., or a mixture of such polymers. The term "melting point" is used herein to denote the temperature above which no crystallinity exists in the polymer (or, when a mixture of crystalline polymers is used, in the major crystalline component of the mixture). Particularly preferred polymers are fluorocarbon polymers. The term "fluorocarbon polymer" is used herein to denote a polymer or mixture of polymers which contains more than 10%, preferably more than 25%, by weight of fluorine. Thus the fluorocarbon polymer may be a single fluorine-containing polymer, a mixture of two or more fluorine-containing polymers, or a mixture of one or more fluorine-containing polymers with one or more polymers which do not contain fluorine. Preferably the fluorocarbon polymer comprises at least 50%, particularly at least 75%, especially at least 85%, by weight of one or more thermoplastic crystalline polymers each containing at least 25% by weight of fluorine, a single such crystalline polymer being preferred. Such a fluorocarbon polymer may contain, for example, a fluorine-containing elastomer and/or a polyolefin, preferably a crystalline polyolefin, in addition to the crystalline fluorine-containing polymer or polymers. The fluorine-containing polymers are generally homo-or co-polymers of one or more fluorine-containing olefinically unsaturated monomers, or copolymers of one or more such monomers with one or more olefins. The fluorocarbon polymer has a melting point of at least 200° C., and will often have a melting point of at least 250° C., e.g. up to 300° C. Preferably the polymeric composition has a viscosity of less than $10^5$ poise at a temperature not more than 60° C. above its melting point. A preferred fluorocarbon polymer is a copolymer of ethylene and tetrafluoroethylene and optionally one or more other comonomers, especially a copolymer comprising 35 to 60 mole percent of ethylene, 35 to 60 mole percent of tetrafluoroethylene and up to 10 mole percent of one or more other comonomers. Other specific polymers which can be used include copolymers of ethylene and chlorotrifluoroethylene; copolymers of vinylidene fluoride with one or both of hexafluoropropylene and tetrafluoroethylene, or with hexafluoroisobutylene; and copolymers of tetrafluoroethylene and hexafluoropropylene.

The polymeric composition can optionally contain suitable additives such as pigments, antioxidants, thermal stabilisers, acid acceptors and processing aids. When, as is preferred, the polymeric composition is electrically insulating, any conductive fillers which are present should be used in small amounts which do not render the composition conductive.

The polymeric components in the first and second compositions are preferably the same, and more preferably the compositions are substantially the same except for the level of cross-linking.

The first and second members can be of any form, but preferably at least the first member is in the form of a layer on a substrate, particularly an elongate substrate, especially an insulating coating on a metal (e.g. copper) wire (stranded or solid) or other electrical conductor. The wire may be for example from 10 to 26 AWG in size. The second member is preferably also in the form of a layer which has the same general shape as the first layer or which serves to join together a number of wires each of which is surrounded by a first layer, thus forming a ribbon cable. The layers are preferably in direct contact, but may be joined together by a layer of adhesive.

The first and second members are preferably formed by melt-extrusion, particularly by sequential extrusion, which may be tubular or pressure extrusion, so that the layers are hot when first contacted, in order to promote migration of the cross-linking agent. The polymeric compositions should preferably be selected so that at least the outer layer has a tensile strength of at least 3,000 psi (210 kg/cm$^2$); and since a higher tensile strength is usually desired in the cross-linked product and there is frequently a loss of tensile strength during the irradiation step, a higher initial tensile strength is preferred, e.g. greater than 6,000 psi (420 kg/cm$^2$), preferably at least 7,000 psi (490 kg/cm$^2$), particularly at least 8,000 psi (560 kg/cm$^2$).

The thickness of the inner layer is generally 0.003 to 0.015 inch, preferably 0.003 to 0.009 inch. The thickness of the outer layer is generally 0.005 to 0.025 inch, preferably 0.005 to 0.009 inch.

Preferred radiation cross-linking agents contain carbon-carbon unsaturated groups in a molar percentage greater than 15, especially greater than 20, particularly greater than 25. In many cases the cross-linking agent contains at least two ethylenic double bonds, which may be present, for example, in allyl, methallyl, propargyl or vinyl groups. We have obtained excellent results with cross-linking agents containing at least two allyl groups, especially three or four allyl groups. Particularly preferred cross-linking agents are triallyl cyanurate (TAC) and triallyl isocyanurate (TAIC); other specific cross-linking agents include triallyl trimellitate, triallyl trimesate, tetrallyl pyromellitate, the diallyl ester of 1,1,3-trimethyl-5-carboxy-3-(p-carboxyphenyl) indan. Other cross-linking agents which are known for incorporation into fluorocarbon polymers prior to shaping, for example those disclosed in U.S. Pat. Nos. 3,763,222; 3,840,619; 3,894,118; 3,911,192; 3,970,770; 3,985,716; 3,995,091 and 4,031,167, can also be used. Mixtures of cross-linking agents can be used.

In the preferred method of preparing articles of the invention, in which cross-linking agent migrates from the second member to the first member, the first composition as extruded contains little or no cross-linking agent (e.g. 0 to 2% by weight, preferably 0%), and the second composition as extruded contains more than is desired during the cross-linking step, e.g. at least 5%, preferably 5 to 25%, particularly 7 to 12%. The time for which the layers should be maintained in contact prior to cross-linking depends upon the extent of migration which is needed and the temperature during such contact, which is preferably 5 to 150° C. below the melting point of the polymer (of the lower melting polymer if there are two or more polymers in the layers). At the time of irradiation, the inner layer preferably contains 0 to 3% of cross-linking agent and the outer layer preferably contains 3 to 10% of crossing agent.

The dosage employed in the irradiation step is preferably below 50 Mrads to ensure that the polymer is not degraded by excessive irradiation, and the dosages preferably employed will of course depend upon the extent of cross-linking desired, balanced against the tendency of the polymer to be degraded by high doses of irradiation. Suitable dosages are generally in the range 2 to 40 Mrads, for example 2 to 30 Mrads, preferably 3 to 20 Mrads, especially 5 to 25 or 5 to 20 Mrads, particularly 5 to 15 Mrads. The ionising radiation can for example be in the form of accelerated electrons or gamma rays. Irradiation is generally carried out at about room temperature, but higher temperatures can also be used.

The inner layer need not be cross-linked at all, but is preferably cross-linked so that it has an $M_{100}$ value of 40 to 250 psi, particularly 50 to 150 psi. The elongation of the inner layer is preferably at least 100%, particularly at least 150%, especially 200 to 300%.

The outer layer is preferably cross-linked so that it has an $M_{100}$ value of at least 400 psi, particularly at least 450 psi, with yet higher values of at least 600 psi being valuable in many cases. The elongation of the outer layer is preferably 40 to 150%, particularly 50 to 120%.

The various physical properties referred to in this specification are measured as set out below.

NOTCH PROPAGATION TEST

This test is carried out on a piece of insulated wire about 12 inch long. A notch is made in the insulation, about 2 inch from one end, by means of a razor blade at right angles to the axis of the wire. The depth of the notch is controlled by mounting the razor blade between two metal blocks so that it protrudes by a distance which is 0.004 inch or, if the insulation comprises two layers and the outer layer has a thickness t which is less than 0.007 inch thick, by a distance which is (t−0.002) inch. The end of the wire closer to the notch is secured to a horizontal mandrel whose diameter is three times the outer diameter of the insulation. A 1.5 lb. weight is secured to the other end of the wire so that the wire hangs vertically. The mandrel is then rotated clockwise, at about 60 revolutions a minute, until most of the wires has wrapped around the mandrel. The mandrel is then rotated, counterclockwise, until the wire has unwrapped and most of the wire has again been wrapped around the mandrel. The mandrel is then rotated clockwise until the wire has unwrapped and most of the wire has again been wrapped around the mandrel. This sequence is continued until visual observation of the notched area shows the conductor to be exposed. If, at this time, the conductor is broken (or some or all of the strands of a stranded wire conductor are broken) then the failure is attributable to that breakage, not to propagation of the notch through the insulation. The number of cycles (half the number of times the rotation of the mandrel is reversed) is recorded.

$M_{100}$ VALUES

The $M_{100}$ values referred to herein are determined by a static modulus test carried out at about 40° C. above the melting point of the polymer, (e.g. at about 320° C. for ETFE polymers). In this test, the stress required to elongate a sample of the cross-linked article by 100% (or to rupture if elongation to 100% cannot be achieved) is measured. Marks separated by 1 inch (2.54 cm) are placed on the center section of the sample [for example a 4 inch (10 cm) length of insulation slipped off a wire, or a strip $\frac{1}{8}\times 0.02\times 4$ inch ($0.32\times 0.05\times 10$ cm) cut from a slab], and the sample is hung vertically in an oven maintained at the test temperature, with a 2 gm. weight attached to the lower end of the sample. After equilibrating for 2 minutes, the weight attached to the lower end of the sample is increased until the distance between the marks has increased by 100% or the sample breaks. The $M_{100}$ value is then calculated from the expression $$M_{100} = \frac{\text{stress} \times 100 - \text{percent elongation}}{\text{initial cross-sectional area}}$$

TENSILE STRENGTHS

The tensile strengths referred to herein are determined in accordance with ASTM D 638-72 (i.e. at 23° C.) at a testing speed of 50 mm (2 inch) per minute.

CROSSED WIRE ABRASION RESISTANCES

The crossed-wire abrasion resistances referred to herein are measured by a test which involves rubbing two crossed wires against each other at a frequency of 50 Hz in a controlled manner, thereby simulating the chafing action that can occur for example in high-vibration areas of aircraft.

The test equipment comprises a small vibrator that is rigidly mounted on a heavy steel frame and causes an axial driver to reciprocate in a horizontal plane. The axial driver is coupled through a horizontal spring steel rod to a rocker arm with a generally horizontal upper surface, on which is mounted a curved wire specimen holder. The center of the holder is vertically above the center of rotation of the rocker arm, and its curvature is such that the upper surface of a wire held therein forms an arc of a circle whose center is at the center of rotation of the rocker arm. The radius of the circle is 5.5 inch (14 cm). Therefore, as the wire is displaced horizontally, it does not have any substantial vertical movement.

The second (upper) wire specimen is mounted on the underside of a beam, one end of which is fastened to the frame through a thin strip of a damping alloy that acts as a hinge and allows the beam to be displaced only in a vertical direction. In the testing position, the beam extends horizontally from the frame so that the wire mounted thereon bears on the wire attached to the rocker arm; the bearing force is provided by a generally vertical rubber band attached to the frame and over the free end of the beam.

The beam and the rocker arm are positioned so that each of the wires forms an angle of 30° with the axis of the axial driver, with an included angle between the crossed wires of 60°. As the lower specimen is reciprocated, the symmetrical arrangement about the driver axis results in a wear pattern that is substantially the same for both wires. The number of cycles needed to cause electrical contact between the wires is measured. The force between the wires is measured with a Hunter force gauge before and after each test by varying a threaded tension adjustment until the upper specimen separates from the lower specimen. A microscope is used to determine the point of separation.

CUT-THROUGH RESISTANCES

A sample of the wire is laid on an anvil and above the anvil there is a weighted knife blade having a wedge shape with a 90° included angle. The blade has a 0.005 inch (0.0125 cm.) flat edge. The anvil is hung by means of a stirrup from the load cell of an Instron Tensile tester and the knife blade mounted on the movable bar of said Tensile tester so that the blade edge lies transversely over the wire specimen. The knife edge is advanced towards the wire at a speed of 0.2 inches (0.51 cm.) per minute. Failure occurs when the knife edge contacts the conductor. The resulting electrical contact causes the tensile tester to stop advancing the blade. The peak reading from the load cell is taken to be the cut-through resistance of the wire.

SCRAPE ABRASION RESISTANCES

A length of wire is rigidly mounted under tension in a jig and a weighted knife blade having a wedge shape with a 90° included angle and a 0.005 inch (0.0125 cm.) radius at the knife edge is then mounted crosswise to the wire with the knife edge resting on the wire. The knife edge can be loaded with varying weights (3 lbs. (1.36 kg.) in all the examples given) to increase the bearing force of the blade on the wire. To test the scrape abrasion resistance of a given wire the blade is reciprocated with a 2 inch (5.1 cm.) stroke longitudinally along the wire at a frequency of 60 strokes (i.e., 30 cycles) per minute. Failure occurs when the knife edge contacts the conductor, causing an electrical circuit to close.

Referring now to the drawing, a stranded metal wire 1 is surrounded by an inner layer 2 of a lightly cross-linked ETFE polymer and an outer layer 3 of an ETFE polymer having a substantially higher degree of cross-linking.

The invention is illustrated by the following Examples.

EXAMPLE 1

A 20 AWG (19/32) stranded tin-coated copper wire was insulated by melt-extruding over it, by a sequential extrusion, an inner insulating layer 0.004 to 0.005 inch thick and an outer insulating layer 0.007 to 0.008 inch thick. The layers were composed of the following compositions

| | % by weight | |
|---|---|---|
| | Inner | Outer |
| ETFE polymer (Tefzel from duPont) | 94.6 | 89.8 |
| Additives | 0.8 | 3.2 |
| Triallyl isocyanurate | 4.6 | 7.0 |

The polymeric insulation was cross-linked by irradiating it to a dosage of 14 Mrads.

EXAMPLE 2

The procedure of Example 1 was followed except that the composition of the inner layer was

| | |
|---|---|
| ETFE polymer (Tefzel from duPont) | 99.2 |
| Additives | 0.8 |
| Triallyl isocyanurate | 0 |

The products of the Examples were subjected to the various tests described above and the following results (averaged for a number of specimens) were obtained.

| | Example 1 | Example 2 |
|---|---|---|
| Tensile strength (psi) | 6790 | 7270 |
| Elongation (5) | | |
| Inner Layer | 35 | 250 |
| Outer Layer | 75 | 70 |
| Notch Propagation (cycles) | 43 | 90* |
| Range for 10 specimens | (62) | (42) |
| Cut Through Resistance | 49 | 44 |
| Range for 10 specimens | (32) | (29) |
| Scrape Abrasion Resistance | 58 | 54 |
| Range for 10 specimens | (38) | (38) |
| $M_{100}$ (psi) | | |
| Inner Layer | 694 | 113 |
| Outer Layer | 725 | 708 |
| Crossed Wire Abrasion (cycles $\times 10^{-6}$) | | |
| at load of 1.4 Kg | 0.137 | 0.236 |
| 1.2 | 0.252 | 0.424 |
| 1.0 | 0.520 | 0.851 |
| 0.8 | 1.261 | 1.996 |
| 0.6 | 3.950 | 5.984 |
| 0.4 | 19.750 | 28.137 |

*In most of the specimens, the cause of failure was breakage of the conductor strands.

We claim:

1. An insulated electrical conductor which comprises (1) an elongated electrical conductor; and (2) electrical insulation which comprises (a) an inner electrically insulating layer which (i) is composed of a first melt-processed, cross-linked fluorocarbon polymer composition wherein the polymer has a melting point of at least 200° C., and (ii) has a first $M_{100}$ value of 0 to 350 psi and an elongation of at least 100%; and (b) an outer electrically insulating layer which (i) is separated from the conductor by the inner layer, (ii) is in contact with said inner layer; (iii) is composed of a second melt-processed cross-linked fluorocarbon polymeric composition wherein the polymer has a melting point of at least 300° C., and (iv) has a second $M_{100}$ value which is at least 350 psi and at least 50 psi higher than the first $M_{100}$ value and an elongation of 40 to 150%.

2. An insulated conductor according to claim 1 wherein the polymer in at least one of the first and second polymeric compositions consists essentially of a crystalline fluorocarbon polymer.

3. An insulated conductor according to claim 2 wherein the polymer in each of the layers consists essentially of a copolymer of ethylene and tetrafluoroethylene.

4. An insulated conductor according to claim 3 wherein the copolymer consists essentially of 35 to 60 mole percent of units derived from ethylene, 35 to 60 mole percent of units derived from tetrafluoroethylene and 0 to 10 mole percent of units derived from at least one additional copolymerizable comonomer.

5. An insulated conductor according to claim 1 wherein the inner layer has an $M_{100}$ value of 0 to 250 psi and the outer layer has an $M_{100}$ value of at least 400 psi.

6. An insulated conductor according to claim 5 wherein the inner layer has an $M_{100}$ value of 50 to 150 psi and the outer layer has an $M_{100}$ value of at least 450 psi.

7. An insulated conductor according to claim 6 wherein the outer layer has an $M_{100}$ value of at least 600 psi.

8. An insulated conductor according to claim 1 wherein the inner layer has an elongation of at least 150% and the outer layer has an elongation of 50 to 120%.

9. An insulated conductor according to claim 1 wherein the inner layer has an elongation at 200 to 300%.

10. Insulated electrical wire which comprises (1) a metal conductor; and (2) electrical insulation which surrounds the conductor and which comprises (a) an inner electrically insulating layer which (i) surrounds and is in direct physical contact with the conductor, (ii) is composed of a radiation cross-linked polymeric composition wherein the polymer consists essentially of a crystalline copolymer which has a melting point of at least 250° C. and consists essentially of 35 to 60 mole percent of units derived from ethylene, 35 to 60 mole percent of units derived from tetrafluoroethylene and 0 to 10 mole percent of units derived from at least one additional copolymerizable comonomer;

(iii) has an $M_{100}$ value at 320° C. of 0 to 350 psi;

(iv) has an elongation of at least 125%; and (v) is 0.003 to 0.015 inch thick; and (b) an outer electrically insulating layer which (i) surrounds and is in direct physical contact with the inner layer, (ii) is composed of a radiation cross-linked polymeric composition wherein the polymer consists essentially of a crystalline copolymer which has a melting point of at least 250° C. and consists essentially of 35 to 60 mole percent of units derived from ethylene, 35 to 60 mole percent of units derived from tetrafluoroethylene and 0 to 10 mole percent of units derived from at least one additional copolymerizable comonomer;

(iii) has an $M_{100}$ value at 320° C. of at least 400 psi;

(iv) has an elongation of 50 to 120%; and (v) is 0.004 to 0.025 inch thick.

11. Insulated electrical wire according to claim 10 wherein the inner layer has an elongation of 200 to 300% and the outer layer has an elongation of 50 to 120%.

12. Insulated electrical wire according to claim 10 wherein each layer has been cross-linked with the aid of at least one of triallyl cyanurate and triallyl isocyanurate.

* * * * *

UNITED STATES PATENT AND TRADEMARK OFFICE

CERTIFICATE OF CORRECTION

PATENT NO. : 5,059,483

DATED : October 22, 1991

INVENTOR(S) : Lunk, et al

It is certified that error appears in the above-indentified patent and that said Letters Patent is hereby corrected as shown below:

On the title page, Item [54] Title, replace "MEIT-PROCESSED," by --MELT-PROCESSED--.

Column 9, Claim 1, line 15, replace "300°C" by --200°C--.

Signed and Sealed this

Fourteenth Day of December, 1993

Attest:

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,059,483
DATED : October 22, 1991
INVENTOR(S) : Lunk et al

It is certified that error appears in the above-indentified patent and that said Letters Patent is hereby corrected as shown below:

Column 6, line 55, after "100" replace "–" (i.e., a minus sign) by -- ÷ -- (i.e., a division sign).

Signed and Sealed this

Twenty-fourth Day of October, 1995

Attest:

BRUCE LEHMAN

*Attesting Officer*

*Commissioner of Patents and Trademarks*